June 23, 1970  R. C. DOBKIN  3,517,227

TRANSDUCER WITH VARIABLE PERMEABILITY MAGNETIC MEMBER

Filed Jan. 3, 1968

INVENTOR:
ROBERT C. DOBKIN,

BY

ATTORNEY

United States Patent Office 3,517,227
Patented June 23, 1970

3,517,227
TRANSDUCER WITH VARIABLE PERMEABILITY MAGNETIC MEMBER
Robert C. Dobkin, Bala Cynwyd, Pa., assignor to General Electric Company, a corporation of New York
Filed Jan. 3, 1968, Ser. No. 695,518
Int. Cl. H02k
U.S. Cl. 310—10                                            2 Claims

ABSTRACT OF THE DISCLOSURE

An electromechanical transducer capable of sensing steady state mechanical forces comprises a flux circuit which includes in series a flux generating means, such as a permanent magnet, a Hall effect device for producing an electrical signal responsive to the flux level in the circuit and a variable permeability magnetic member responsive to mechanical forces. A second magnet in series with a second variable permeability member connected to the Hall effect device in parallel with the first magnet and member is used in the preferred embodiment of the present invention to cause a null reading from the Hall effect device when no mechanical input force is present.

INTRODUCTION

This invention pertains to a transducer for converting a mechanical input into an electrical signal. More specifically, it pertains to electromechanical transducers based on variable permeability magnetic members.

BACKGROUND OF THE INVENTION

Most electromechanical instruments for measuring acceleration, pressure, etc., require transducers for converting mechanical forces into electrical signals. Some materials such as the Permalloys are known to have variable magnetic permeability, i.e., their conductivity to magnetic flux varies with the mechanical stress on the material. The use of variable permeability members as transducers in electromechanical instruments is well-known. Generally the variable permeability member is disposed so that a force to be measured causes a stress in the member. A flux generating means associated with the variable permeability member causes a flux in the member. When stress is induced in the variable permeability member, the flux level therein changes. This change in the flux level produces a voltage transient which constitutes the output signal in an inductive coil associated with the variable permeability member. The shortcoming of such systems is obvious. While they may be useful to measure changing forces, they are incapable of measuring constant forces because the output sensor is insensitive to anything other than transient signals.

It is therefore an object of the present invention to provide a variable permeability transducer with means for determining steady state levels of mechanical forces.

It is a further object of this invention to provide a simple, self-contained device capable of measuring mechanical forces which device yields an electrical signal proportional thereto.

Still another object of this invention is to provide a highly sensitive and highly practical mechanical-to-electrical energy transducer that utilizes a variable permeability magnetic member.

BRIEF DESCRIPTION OF THE INVENTION

These and other objects are met in accordance with the present invention by a magnetic flux circuit including a flux generating element such as a permanent magnet, a variable permeability element which senses pressure, acceleration or other similar mechanical phenomenon and exhibits a change in permeability in response thereto, and a Hall effect device which produces an electrical output signal proportional to the flux level in the flux circuit.

DETAILED DESCRIPTION OF THE INVENTION

While the specification concludes with claims particularly pointing out and distinctly claiming the subject matter of the present invention, this invention may be better understood from the following description, taken in conjunction with the following drawings, in which:

Figure 1:
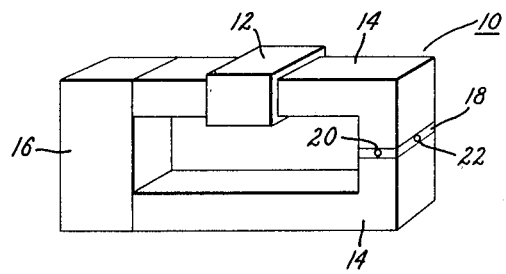
FIG. 1 is a perspective view of the magnetic flux circuit in one form of the present invention.

Referring now more specifically to FIG. 1, there is shown a magnetic flux circuit 10 comprising a permanent magnet 12, magnetic flux conductive members 14, a variable permeability magnetic material member 16, composed for example of one of the Permalloys, and a Hall effect device 18 with electrical contacts 20 and 22 for producing an electrical output signal proportional to the flux level in flux circuit 10. Magnetic flux conductive members 14, may be composed of any magnetic material. Members 14 typically are simply iron bars. All of the elements in flux circuit 10 are held in physical contact with adjoining elements to minimize flux loss in the circuit.

In operation, a mechanical signal, such as the thrust of a rocket engine, the force of an accelerating or vibrating body, etc., is applied to variable permeability member 16 causing a change in the flux level produced in circuit 10 by permanent magnet 12. An electrical output signal in Hall device 18 is produced which is directly related to the flux level in circuit 10 and indirectly related, through the change in permeability in member 16, to the mechanical force exerted thereon.

Figure 2:
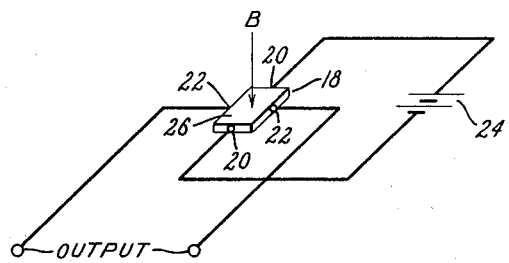
FIG. 2 is a schematic view of the electrical circuit associated with one component of the magnetic flux circuit shown in FIG. 1.

In FIG. 2, the electrical circuits associated with Hall effect device 18 are shown in detail. Specifically a pair of contacts 20 disposed transversely of flux path B on semiconductive body member 26, are connected to a D-C source 24. Typically, body member 26 is composed of semiconductive indium antimonide which provides a current path between contacts 20. Contacts 22 disposed transversely of both the flux path B and the current path between the pair of contacts 20 are connected to output terminals. In the absence of magnetic flux to Hall effect device 18, contacts 22 which are equal distance from each of the contacts 20 are at essentially the same voltage potential so that no output signal is produced. Due to the Hall effect, when a flux transverse to the current path between contacts 20 is present, a voltage potential is produced between contacts 22 disposed transversely of flux path B and the current path between contacts 22 and an output signal, more specifically a voltage potential, is then registered at the output terminals. Such a signal may be observed, for example, by a voltmeter connected to the output terminals.

Figure 3:
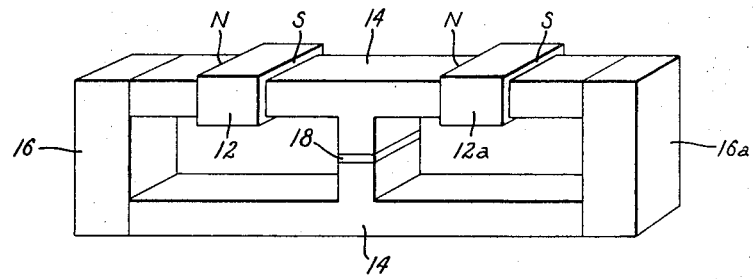
FIG. 3 is a perspective view of the magnetic flux circuit comprising the preferred embodiment of the present invention.

In FIG. 3, in which like numbers represent like elements, there is shown the preferred embodiment of the present invention. In this embodiment, the flux circuit shown in FIG. 1 is modified by the addition of a second permanent magnet 12a and a second variable permeability member 16a in parallel with the corresponding and equivalent magnet 12 and member 16. In this embodiment, the flux level in Hall effect device 18 is essentially zero when members 16 and 16a are under equal stress. Thus a force applied to one of the members 16, 16a or the application of unequal forces to these two members, will cause the output potential from Hall effect device 18 to deviate from zero. This embodiment is preferred because of its high degree of sensitivity and ease of calibration rendering it more practical than other known embodiments of the present invention.

While the present invention has been described with reference to particular embodiments thereof for purposes of clarity and convenience, it should be understood that numerous modifications may be made by those skilled in the art without departing from the invention's true spirit and scope. One such modification is the substitution of an electromagnetic coil for the permanent magnet used as the flux generating means in the above described embodiments. The appended claims are intended to cover all such equivalent variations as come within the true spirit and scope of the present invention.

What I claim as new and desire to secure by Letters Patent of the United States is:

1. A transducer yielding an electrical output signal proportional to a mechanical input, said transducer comprising a magnetic flux circuit, said circuit including, in series, (a) a flux generating means, (b) a stress responsive, flux conductive means which comprises a member composed of a magnetic material, the permeability of which varies with induced mechanical stress in the material, and (c) a Hall effect device for producing an electrical output signal proportional to the flux level in the circuit.

2. A transducer, as recited in claim 1, wherein a second flux conductive, stress responsive means in series with a second flux generating means, both substantially identical to said first corresponding means recited in claim 1, are connected to said Hall effect flux level measuring means in parallel with said first corresponding means.

References Cited

UNITED STATES PATENTS

| | | | |
|---|---|---|---|
| 3,060,370 | 10/1962 | Varterasian | 323—94 |
| 3,286,528 | 11/1966 | Julien-Davin | 73—398 |

DAVID X. SLINEY, Primary Examiner

U.S. Cl. X.R.

310—26